UNITED STATES PATENT OFFICE 2,657,980

PRODUCTION OF HYDROGEN PEROXIDE

Jerome W. Sprauer, Niagara Falls, N. Y., assignor to E. I. du Pont de Nemours & Company, Wilmington, Del., a corporation of Delaware No Drawing. Application November 5, 1949, Serial No. 125,848

12 Claims. (Cl. 23—207)

This invention relates to a method for the production of hydrogen peroxide using alkylated anthraquinones as intermediates.

U. S. Patent 2,158,525 discloses a process for the production of hydrogen peroxide wherein an alkylated anthraquinone is hydrogenated in a solvent by means of hydrogen in the presence of a catalyst to the corresponding anthrahydroquinone which, after separation of the catalyst, is oxidized by means of oxygen to produce hydrogen peroxide. The anthraquinone is regenerated during the oxidation and in cyclic operations is recycled to the hydrogenation stage after first removing the product hydrogen peroxide, e. g. by aqueous extraction. The present invention relates to an improvement of this process. More particularly it relates to an improvement in the hydrogenation step wherein hydrogenation is carried out in the presence of a specific catalyst which has been found to be exceedingly well suited for this purpose.

Nickel catalysts have generally been regarded as the most suitable for use in hydrogenating alkylated anthraquinones in processes of the above type. Apparently the well-known Raney nickel type hydrogenation catalyst, prepared by leaching a pulverized nickel-aluminum alloy with aqueous sodium hydroxide, has heretofore been preferred.

Nickel catalysts are not entirely satisfactory for the intended use. Thus Raney nickel catalyst is disadvantageous because of the difficulty encountered in filtering this finely divided material from the working solution before the latter is passed to the oxidation stage. Moreover, this catalyst is relatively expensive and for economical catalyst life it requires the use of rather elaborate precautions for the complete removal of hydrogen peroxide and oxygen from the recycled alkylated anthraquinone solution. Another disadvantage in using Raney nickel is that it leads to rather a high rate of formation of undesirable by-products in the hydrogenation reaction. These by-products are compounds which are no longer useful for the synthesis of hydrogen peroxide. Raney nickel, as is well known, is pyrophoric, and its use, therefore, introduces a handling hazard. Moreover, insofar as is known to applicant there is no known satisfactory procedure for regenerating such a catalyst.

It is an object of this invention to provide an improved process for the production of hydrogen peroxide involving the cyclic reduction and oxidation of alkylated anthraquinones. A particular object is to provide an improved catalyst for use in the hydrogenation stage of such a process, which catalyst will have a high activity and a relatively long catalyst life. A still further object is to provide a catalyst which is not harmed by contact with hydrogen peroxide or oxygen, can be prepared in a readily filterable or granular form, is selective in activity and generally superior to the nickel catalysts heretofore proposed. These and still further objects will be apparent from the following description.

The above objects are accomplished in accordance with the invention by the production of hydrogen peroxide in a cyclic process in which an alkylated anthraquinone and its corresponding anthrahydroquinone are employed as organic intermediates and palladium supported on activated alumina is employed as the catalyst in the hydrogenation stage. It has been discovered that the combination of metallic palladium supported on activated alumina is an outstanding catalyst for this purpose and that its use is surprisingly and distinctly superior to the use of Raney nickel and to palladium when the latter is supported on many of the materials commonly used as catalyst supports.

The combination of metallic palladium supported on activated alumina appears to be unique among hydrogenation catalysts for the present purpose. Thus, its high activity as a catalyst is most surprising in view of the fact that catalysts consisting of palladium supported on other common support materials, which are well known as active hydrogenation catalysts in other reactions, are almost completely inert and valueless for the present purpose. For example, commercial granular, active carbons derived from coconut shell, wood, lignin, or coal, all give palladium supported catalysts having little or no activity. Similarly, palladium supported on silica gel is practically inert as is also palladium supported on alumina consisting principally of corundum.

The catalyst support materials which are suitable for the present purpose contain activated alumina in predominating amounts, i. e., at least 50% by weight. By "activated alumina" is meant any natural or synthetic hydrated alumina which has been dehydrated or partially dehydrated by heating in known manner, for example at 300–800° C., whereby a microporous alumina is obtained containing alpha-alumina monohydrate, gamma-alumina, or both. Activated aluminas are well known and are available commercially. In contrast with the activated aluminas is the well-known form of alumina known as corundum, which is not microporous and is unsuitable for the present purpose. The supports which are suitable may contain minor amounts of materials other than activated alumina, such as silica, but on an anhydrous basis their $Al_2O_3$ content should be at least 75% by weight.

It has been discovered that the catalyst of this invention is not adversely affected by hydrogen peroxide or oxygen present in the working solution. These substances are normally present in small amounts in the recycled oxidized working solution and when using a nickel catalyst they must be removed before contact with the catalyst is made. Moreover, the present catalyst has a relatively long effective life even though no special purification of the recycled working solution is practiced except to remove water present as a separate phase. In contrast, rather elaborate purification treatments have been considered necessary when using a nickel catalyst. A still further advantage of the present catalyst is that it can be regenerated effectively, e. g. by treatment with a solution of sodium hypochlorite. Insofar as is known to me, there is no known method for effectively regenerating nickel catalyst.

As is well known, any alkylated anthraquinone, and its corresponding anthrahydroquinone, may be used as the organic intermediates in this type of a cyclic process, and they may also be used in conjunction with the present catalyst. Specific examples of suitable alkylated anthraquinones are 2-ethyl-, 2-isopropyl-, 2-sec.-butyl-, 2-t-butyl-, 2-sec.-amyl-, 1,3-dimethyl-, 2,3-dimethyl-, 1,4-dimethyl-, and 2,7-dimethyl-anthraquinone. The corresponding tetrahydroanthraquinones may also be employed, examples of which are tetrahydro-2-ethylanthraquinone and tetrahydro-2-tertiary-butylanthraquinone. Heretofore, 2-ethylanthraquinone appears to have been preferred and whereas that compound may be used effectively in practicing the present invention it is preferred that 2-tertiary-butylanthraquinone be used. This compound is extremely stable under the conditions of use and has a high solubility both in the reduced and oxidized form particularly when the solvent is a mixture of a primary or secondary nonyl alcohol, such as diisobutylcarbinol or 3,5,5-trimethylhexanol-1, and a substituted naphthalene such as alpha-methylnaphthalene, as disclosed in the copending application of Harris and Sprauer, S. N. 125,847, filed November 5, 1949. The use of 2-tertiary-butylanthraquinone as the quinone intermediate in cyclic processes of this type is disclosed in the copending application of Hinegardner, S. N. 125,831, filed November 5, 1949.

It is well known that when starting with any particular alkylated anthraquinone in any cyclic system of the present type, continued operation results in slow hydrogenation of one of the aromatic rings of the anthraquinone to produce the corresponding tetrahydroanthraquinone which generally builds up to a more or less steady state depending upon the conditions employed. Such tetrahydroanthraquinone is generally less soluble than the parent compound and will tend to precipitate out at the higher concentrations. The tetrahydroanthraquinone also produces hydrogen peroxide in the cyclic system. Despite the fact that it is oxidized with greater difficulty, a substantial concentration thereof, e. g. 10 to 40% of the total quinone values, is desirable since it increases the total anthrahydroquinones that can be held in solution and thus increases the concentration of the hydrogen peroxide that can be obtained in the aqueous extract.

Any suitable solvent may be employed to dissolve the anthraquinone during the hydrogenation stage and to dissolve the anthrahydroquinone during the oxidation stage. It is preferable that a solvent be used which can function satisfactorily in both stages of the process. Solvents consisting of mixtures of compounds such as benzene, toluene and the like with alcohols such as amyl alcohol, cyclohexanol, methylcyclohexanol and the like have been suggested for this purpose. A particularly effective solvent is a mixture of a monomethyl- or dimethylnaphthalene with a primary or a secondary nonyl alcohol, as disclosed in the copending application referred to above. Preferred solvent mixtures will contain 25–75% of the nonyl alcohol and 75–25% of the substituted naphthalene. Mixtures containing 65–35% of diisobutylcarbinol or 3,5,5-trimethylhexanol-1 with 35–65% by volume of alpha-methylnaphthalene are especially well suited. These solvent mixtures are characterized by their high stability, low vapor pressures and their high solvent powers for the alkylated anthraquinones and their corresponding anthrahydroquinones, and by the fact that the distribution coefficients for hydrogen peroxide between water and the solvents are unusually high.

The following examples demonstrate the effectiveness of the present catalyst and its use.

*Example 1*

400 g. of 100–200 mesh gamma-alumina was suspended in 800 g. of water and the suspension heated to 70° C. While agitating the suspension there was added an aqueous solution of 4 g. palladous chloride in 160 cc. water which solution also contained 1.6 cc. of concentrated hydrochloric acid. While still stirring the mixture 4 cc. of 37% formaldehyde solution (to reduce the palladium salt) were added and then after several minutes and with only occasional stirring while maintaining the solution at 70–80° C. there was added 200 cc. of a 5% sodium bicarbonate solution. The mixture was maintained at this temperature for 30 minutes with occasional stirring and then the catalyst particles were filtered out, washed with water and dried in a shallow layer at 100° C. for two hours. The final material contained about 0.7% Pd by weight.

The above catalyst was charged in increments to the working solution in the hydrogenator of a cyclic system such as has been generally described above. This working solution consisted of 175 g. per liter of 2-tertiary-butylanthraquinone dissolved in a solvent mixture consisting of 60% diisobutylcarbinol and 40% by volume alpha-methylnaphthalene. The catalyst was charged and the solution circulated at rates to maintain a concentration of the corresponding anthrahydroquinone equivalent to about 0.33 mol. $H_2O_2/L$. The solution was at 30–33° C. It was agitated by passing hydrogen at atmospheric pressure into it, about 8% of the hydrogen employed being absorbed. Cyclic operation of the system was continued with catalyst additions to maintain the desired activity until a total of 40 g. had been charged per liter of solution at which time a total of 55 g. of $H_2O_2$ had been synthesized and extracted for each gram of the supported catalyst charged. In the experiment, the recycled working solution from which the hydrogen peroxide had been removed by water extraction contained a residual amount of hydrogen peroxide in concentrations on the order of 0.01 to 0.3 mol. $H_2O_2/L$. and was substantially saturated

Example 2

37 g. of a catalyst consisting of palladium supported on 14–35 mesh gamma-alumina and prepared by the method described in Example 1 were charged to a fixed catalyst tube of a cyclic system. The catalyst used contained 4.9 g. per liter of palladium. Working solution of the composition set forth in Example 1 and gaseous hydrogen at about 1.05 atmospheres everage pressure were passed concurrently downwardly over this catalyst bed at room temperature. Absorption of hydrogen occurred at a rate corresponding to a hydrogen peroxide synthesizing capacity of 1.8 mol. $H_2O_2$/hr./L. of catalyst initially. This rate decreased gradually to 1 mol. $H_2O_2$/hr./L. at the end of 120 hours of use.

Example 3

An 8–14 mesh gamma-alumina containing 3% $SiO_2$ was suspended in water to which a solution of chloropalladous acid was then added. The slurry was shaken at room temperature with hydrogen for about one hour after which the resulting supported palladium catalyst was separated by filtration, washed and air-dried at room temperature. The final catalyst contained 0.09% palladium. The activity of this catalyst was compared with that of the catalyst of Example 1 by measuring the initial rate of hydrogen absorption per unit weight of palladium in 0.2 g. of the supported catalyst suspended in a working solution consisting of 175 g. per liter of 2-tertiary-butylanthraquinone dissolved in a mixture of 60% diisobutylcarbinol and 40% by volume alpha-methylnaphthalene under comparable stirring conditions. The two catalysts were found to have about the same activity.

Example 4

A sample of 8–14 mesh gamma-alumina was impregnated with chloropalladous acid dissolved in just enough water to thoroughly wet the alumina. The mixture was dried on the steam bath then charged to a tube furnace and reduced in a hydrogen atmosphere for one hour at 230–270° C. The final catalyst contained 0.13% palladium. By comparative tests carried out as described in Example 3, this catalyst was found to have about the same activity per unit weight of palladium as the catalyst of Example 3.

Example 5

6.7 g. of a commercial silica-alumina hydrocarbon cracking catalyst of 100–325 mesh size and containing about 10% $Al_2O_3$ and 90% $SiO_2$ was treated with 10 cc. of 33% formaldehyde containing 2 g. sodium bicarbonate. The mixture was decanted, and the support washed twice by decantation. A hot solution of 0.2 g. palladous chloride in 10 cc. water containing 0.1 cc. of concentrated hydrochloric acid was then added. After several minutes 0.5 cc. 37% formaldehyde was added followed by one gram sodium bicarbonate. The slurry was digested one hour at about 100° C. and the catalyst particles filtered out, washed and dried one hour at about 100° C. By tests carried out as described in Example 3 this catalyst showed only about one-third the activity per unit weight of palladium as the catalyst of Example 1.

Example 6

A commercial activated coconut charcoal of 6–14 mesh was digested in 10% nitric acid for six hours at 100° C., washed then dried at 100° C. 36 g. of this material was impregnated with a solution of chloropalladous acid and dried to superficial dryness on the steam bath. Reduction was effected in a hydrogen stream for 20 hours at 200° C. The resulting supported catalyst contained about 0.1% palladium and upon completion of the preparation it was discharged into methanol without contact with air. By tests carried out as described in Example 3, this catalyst was found to be substantially completely inactive compared to the catalyst of Example 1.

Example 7

A commercial active carbon obtained from coal was leached with 20% nitric acid, washed with water then suspended in hot water. Chloropalladous acid in an amount to give 0.2% palladium on the dried catalyst was added, followed by formaldehyde and sufficient sodium hydroxide to give a pH of 8. The catalyst particles were then washed, and dried. By tests carried out as described in Example 3, this catalyst was found to be substantially completely inactive compared to the catalyst of Example 1.

Example 8

A commercial activated carbon from lignin of 10–30 mesh was treated as in the previous example to yield a supported catalyst containing about 2% metallic palladium. This catalyst showed only a trace of activity when used in the hydrogenation of 2-tertiary-butylanthraquinone.

Example 9

5 g. of a finely divided commercial decolorizing carbon of vegetable origin was suspended in 38 cc. of boiling 1.5% sodium bicarbonate solution. 0.3 g. palladous chloride in 17 cc. water containing 0.1 cc. concentrated hydrochloric acid was added slowly with stirring. 1.2 cc. of 18% aqueous formaldehyde was then slowly added followed by 0.5 g. sodium bicarbonate. After boiling the solution for 30 minutes, the mixture was filtered and the supported catalyst washed and air-dried. By tests carried out as described in Example 3, this catalyst was found to be only about one-fifth as active as the catalyst of Example 1.

Example 10

A commercial granular corundum was leached with nitric acid solution and washed. It was then impregnated with palladous chloride in hydrochloric acid solution following which the mixture was dried to superficial dryness on the steam bath. Reduction was then effected at 200° C. in a hydrogen stream for 1.5 hours. The final catalyst contained 0.5% palladium. It showed practically no activity in hydrogenating 2-tertiary-butylanthraquinone.

Example 11

A commercial palladium catalyst supported on silica gel containing about 0.3% Pd was found to be relatively inactive when compared with the catalyst of Example 1 by the method described in Example 3.

Example 12

A palladium catalyst containing about 5% Pd supported on barium sulfate was prepared as described in "Organic Synthesis," vol. 26, page 77, John Wiley and Sons, Inc., New York (1946).

In tests carried out as described in Example 3, this catalyst showed only one-fifth the activity per unit weight of palladium of the catalyst of Example 1.

*Example 13*

A commercial palladium catalyst containing 8.2% Pd supported on fibrous asbestos in comparative tests carried out as described in Example 3 showed only three-tenths the activity per unit weight of palladium of the catalyst of Example 1.

*Example 14*

200 g. of an activated alumina which was predominantly alpha-alumina monohydrate but contained some gamma-alumina in minor amount, was suspended in 500 cc. of water. The slurry was adjusted to a pH of about 5 by addition of concentrated hydrochloric acid, then heated to 80° C. While stirring the suspension a solution of 0.67 g. of palladous chloride in 27 cc. of water containing 0.27 cc. of concentrated hydrochloric acid was slowly added. 0.67 cc. of 37% formaldehyde was added then a 5% solution of sodium bicarbonate was slowly added with stirring until a pH of about 8 was reached. The slurry was maintained at 70 to 80° C. for one half hour then 1.33 cc. of 35% hydrogen peroxide was added slowly. Finally, the catalyst particles were filtered off, washed and dried at 110° C.

The above catalyst was charged gradually to a cyclic system as described in Example 1 until a total of about 83 g. of catalyst had been charged per liter of working solution. During this time a total of 25 g. $H_2O_2$ was produced per gram of supported catalyst charged.

It has been discovered that the present catalyst has a marked superiority over the Raney nickel type catalysts with respect to degradation of the alkylated anthraquinone intermediates. Apparently this superiority results from the greater selectivity of the present catalyst compared to Raney nickel. Thus, the tendency to form by-products having no $H_2O_2$-synthesizing value in the system is substantially less when using the present catalyst than when using Raney nickel as is shown in Example 15.

*Example 15*

About 5 liters of a working solution containing 175 g. per liter of 2-tertiary-butylanthraquinone in a solvent mixture of 60% diisobutylcarbinol and 40% by volume alpha-methylnaphthalene was continuously circulated at about 20 cc. per minute through a hydrogenation zone in which catalyst prepared as described in Example 1 was suspended in the working solution, an oxidizing zone, and an extraction zone, then returned to the hydrogenating zone. After 1975 hours of cyclic operation the degradation loss corresponded to only 0.005 g. of the anthraquinone equivalent per g. of $H_2O_2$ produced.

In a comparable experiment about 5 liters of working solution of the same initial composition was hydrogenated over Raney nickel catalyst, oxidized, extracted and then recycled to the hydrogenator. The operations were carried out batchwise because of the difficulty of operating continuously when using this catalyst. After repeating the cycle 68 times, the degradation loss corresponded to 0.027 g. of 2-tertiary-butylanthraquinone equivalent per gram of $H_2O_2$ produced.

Catalysts comprising metallic palladium supported on activated alumina may be prepared for the present purpose by any of the well-known methods for preparing supported palladium catalysts. Usually such methods involve impregnating the support with a solution of a palladium compound, such as palladous chloride or chloropalladous acid, and then reducing the impregnated compound to metallic palladium. Suitable reducing agents are formaldehyde and hydrogen. Catalysts containing from about 0.01 to 10% by weight of palladium based on the weight of the catalyst composition are generally useful for the present purpose but the palladium content will preferably range from about 0.1 to 2% by weight.

Any of the means commonly employed for contacting solutions with a hydrogenation catalyst and a hydrogen-containing gas may be employed when using the present catalyst. In one such method, the supported catalyst, e. g. in a particle size range of 2–65 mesh, is fixedly supported in a deep bed and the working solution of the system together with hydrogen-containing gas are passed through the bed either concurrently or countercurrently. When the catalyst activity falls too low to be practically useful, the catalyst may be regenerated in place by any suitable method.

Another and a preferred way is to suspend the catalyst in the working solution in the hydrogenator. Catalyst of a wide range of particle size may be used, e. g. the particle size may range from about 10 microns in diameter to about 35 mesh. The three-phase contact between the working solution, the catalyst and the gaseous hydrogen may be effected in any known manner such as by circulating the catalyst suspension through a hydrogen atmosphere or by mechanically agitating the suspension beneath a hydrogen atmosphere. Another way involves introducing hydrogen or a hydrogen-containing gas near the bottom of the working solution in which the catalyst is suspended. In general, any mechanical agitation of the mixture containing the suspended catalyst should be mild in order to minimize attrition of the catalyst particles. It has been found that catalyst cost can be markedly lowered by using the catalyst in a suspended form in the working solution.

In the most preferred method of operation catalyst particles of about 80–200 mesh size suspended in the working solution are agitated mildly by the rising stream of hydrogen introduced in dispersed form near the bottom of the hydrogenator in an amount sufficient to create turbulence throughout the liquid. Surprisingly, such mild agitation achieves a productivity per unit of reactor volume comparable with that obtained by violent agitation. The advantage of agitation by means of hydrogen introduced in this way, is that attrition loss is greatly minimized. Any excess hydrogen can of course be recycled. Hydrogenation in such a system can be carried out batchwise or continuously, the latter being preferred. Sufficient catalyst should be suspended to give the desired production rate and the working solution may be fed continuously to the hydrogenator and fresh catalyst added incrementally to balance catalyst inactivation as the hydrogenated solution is continuously withdrawn. Spent catalyst is withdrawn intermittently and replaced by new catalyst at such a rate as to maintain the catalyst activity and concentration at desired levels. Catalyst concentrations as high as 10–20% and higher based on the total contents of the hydrogenator may be used. The concentration of suspended catalyst will generally be in the range of 0.1 to 20%, the preferred concentration being 1 to 7%. Catalyst may be separated from the effluent solution from the hydrogenator in any known manner, such as by gravity sedimentation, centrifugation, filtration, or the like, since the relatively large catalyst particles makes this a reasonably simple engineering operation.

The use of a suspended catalyst as described above gives better results than when a fixed bed of catalyst is used under otherwise comparable conditions. The reason for this is not entirely clear but apparently in the suspension system the catalyst is maintained in a more uniform environment which should result in less tendency for local over-hydrogenation to occur.

I claim:

1. In a process for the production of hydrogen peroxide wherein an alkylated anthraquinone is hydrogenated in solution by means of hydrogen in the presence of a hydrogenation catalyst to yield an alkylated anthrahydroquinone, the latter is oxidized to produce hydrogen peroxide and to regenerate said anthraquinone and said regenerated anthraquinone is recycled to the hydrogenation stage, the improvement which comprises employing as the hydrogenation catalyst metallic palladium supported on activated alumina.

2. The process of claim 1 employing a catalyst in which the palladium content is 0.01 to 10% by weight.

3. The process of claim 1 in which hydrogenation of the anthraquinone is accomplished by agitating a suspension of the catalyst particles in the solution of the anthraquinone by means of a stream of hydrogen-containing gas.

4. The process of claim 3 wherein the concentration of palladium in the catalyst is 0.01 to 10% and the concentration of the catalyst particles in the suspension is 0.1 to 20%.

5. The process comprising hydrogenating an alkylated anthraquinone in solution by means of hydrogen in the presence of a catalyst comprising metallic palladium supported on activated alumina.

6. The process of claim 5 wherein the anthraquinone is 2-tertiary-butylanthraquinone.

7. The process of claim 5 wherein the solution hydrogenated is a solution of 2-tertiary-butylanthraquinone in a solvent comprising 25 to 75% of an alcohol from the group consisting of the primary and secondary nonyl alcohols, and 75 to 25% by volume of a substance from the group consisting of the monomethyl- and dimethyl-naphthalenes.

8. The method of claim 7 wherein the solvent comprises 25 to 75% diisobutylcarbinol and 75 to 25% by volume of alpha-methylnaphthalene.

9. The process of claim 5 wherein the palladium content of the catalyst is 0.01 to 10%.

10. The process of claim 9 wherein the catalyst is suspended in the solution of the anthraquinone in a concentration of 0.1 to 20%.

11. The process of claim 10 wherein the solution containing the suspended catalyst is agitated by a stream of hydrogen passed therethrough.

12. In a process for producing hydrogen peroxide which includes the following operations repeatedly performed in cyclic manner: (a) an alkylated anthraquinone in solution is hydrogenated in the presence of a hydrogenation catalyst to yield a solution of an alkylated anthrahydroquinone; (b) the solution resulting from step (a) is reacted with oxygen to produce a solution of hydrogen peroxide and regenerated alkylated anthraquinone; (c) the solution from step (b) is subjected to extraction and the nonaqueous phase from said extraction comprising a solution of said regenerated alkylated anthraquinone is recycled to step (a), the improvements comprising employing metallic palladium supported on activated alumina as the catalyst in step (a) and recycling to step (a) nonaqueous phase from step (c) containing an amount of hydrogen peroxide on the order of 0.01 to 0.03 mole $H_2O_2$ per liter.

JEROME W. SPRAUER.

References Cited in the file of this patent

UNITED STATES PATENTS

| Number | Name | Date |
|---|---|---|
| 1,108,752 | Henkel et al. | Aug. 25, 1914 |
| 2,158,525 | Riedl et al. | May 16, 1939 |
| 2,215,883 | Riedl et al. | Sept. 24, 1940 |
| 2,369,912 | Pfleiderer et al. | Feb. 20, 1945 |
| 2,400,012 | Littmann | May 7, 1946 |

FOREIGN PATENTS

| Number | Country | Date |
|---|---|---|
| 465,070 | Great Britain | Apr. 30, 1937 |